US010332544B2

(12) United States Patent
Dai et al.

(10) Patent No.: US 10,332,544 B2
(45) **Date of Patent: *Jun. 25, 2019**

(54) MICROPHONE AND CORRESPONDING DIGITAL INTERFACE

(71) Applicant: Knowles Electronics, LLC, Itasca, IL (US)

(72) Inventors: Weiwen Dai, Elgin, IL (US); Robert A. Popper, Lemont, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,724

(22) Filed: Jun. 26, 2018

(65) Prior Publication Data

US 2018/0308511 A1 Oct. 25, 2018

Related U.S. Application Data

(63) Continuation of application No. 14/533,652, filed on Nov. 5, 2014, now Pat. No. 10,020,008, which is a continuation-in-part of application No. 14/282,101, filed on May 20, 2014, now Pat. No. 9,712,923.

(60) Provisional application No. 61/901,832, filed on Nov. 8, 2013, provisional application No. 61/826,587, filed on May 23, 2013.

(51) Int. Cl.
*G06F 17/00* (2019.01)
*G10L 25/78* (2013.01)
*H04R 3/00* (2006.01)

(52) U.S. Cl.
CPC ................ *G10L 25/78* (2013.01); *H04R 3/00* (2013.01); *H04R 2410/00* (2013.01); *H04R 2499/11* (2013.01)

(58) Field of Classification Search
CPC ....... G10L 25/78; H04R 3/00; H04R 2410/00; H04R 2499/11
USPC ........................ 381/111; 704/208; 455/556.1
See application file for complete search history.

(56) References Cited

U.S. PATENT DOCUMENTS 4,831,558 A 5/1989 Shoup et al.
5,555,287 A 9/1996 Gulick et al.
5,675,808 A 10/1997 Gulick et al.
(Continued)

FOREIGN PATENT DOCUMENTS

CN 1083639 A 3/1994
CN 1306472 A 8/2001
(Continued)

OTHER PUBLICATIONS

Anonymous, "dsPIC30F Digital Signal Controllers," retrieved from http://ww1.microchip.com/downloads/en/DeviceDoc/dspbrochure_70095G.pdf (Oct. 31, 2004).

*Primary Examiner* — Md S Elahee
(74) *Attorney, Agent, or Firm* — Foley & Lardner LLP

(57) ABSTRACT

A microphone apparatus including a MEMS transducer, an acoustic activity detector, a local oscillator, and an external-device interface standardized for compatibility with devices from different manufacturers is disclosed. The microphone apparatus has a first mode of operation during which the apparatus is clocked by the internal clock signal when the acoustic activity detector processes digital data for acoustic activity, and a second mode of operation during which the microphone apparatus is clocked by an external clock signal received at the external-device interface after voice activity is detected by the acoustic activity detector.

25 Claims, 6 Drawing Sheets

(56) References Cited

U.S. PATENT DOCUMENTS

| | | | |
|---|---|---|---|
| 5,819,219 | A | 10/1998 | De Vos et al. |
| 5,822,598 | A | 10/1998 | Lam |
| 6,057,791 | A | 5/2000 | Knapp |
| 6,070,140 | A | 5/2000 | Tran |
| 6,154,721 | A | 11/2000 | Sonnic |
| 6,249,757 | B1 | 6/2001 | Cason |
| 6,259,291 | B1 | 7/2001 | Huang |
| 6,397,186 | B1 | 5/2002 | Bush et al. |
| 6,756,700 | B2 | 6/2004 | Zeng |
| 6,829,244 | B1 | 12/2004 | Wildfeuer et al. |
| 7,102,452 | B1 | 9/2006 | Holmes |
| 7,190,038 | B2 | 3/2007 | Dehe et al. |
| 7,415,416 | B2 | 8/2008 | Rees |
| 7,473,572 | B2 | 1/2009 | Dehe et al. |
| 7,546,498 | B1 | 6/2009 | Tang et al. |
| 7,619,551 | B1 | 11/2009 | Wu |
| 7,630,504 | B2 | 12/2009 | Poulsen |
| 7,774,204 | B2 | 8/2010 | Mozer et al. |
| 7,781,249 | B2 | 8/2010 | Laming et al. |
| 7,795,695 | B2 | 9/2010 | Weigold et al. |
| 7,825,484 | B2 | 11/2010 | Martin et al. |
| 7,829,961 | B2 | 11/2010 | Hsiao |
| 7,856,283 | B2 | 12/2010 | Burk et al. |
| 7,856,804 | B2 | 12/2010 | Laming et al. |
| 7,903,831 | B2 | 3/2011 | Song |
| 7,957,972 | B2 | 6/2011 | Huang et al. |
| 8,274,856 | B2 | 9/2012 | Byeon |
| 8,275,148 | B2 | 9/2012 | Li et al. |
| 8,666,751 | B2 | 3/2014 | Murthi et al. |
| 8,972,252 | B2 | 3/2015 | Hung et al. |
| 8,996,381 | B2 | 3/2015 | Mozer et al. |
| 9,043,211 | B2 | 5/2015 | Haiut et al. |
| 9,111,548 | B2 | 8/2015 | Nandy et al. |
| 9,112,984 | B2 | 8/2015 | Sejnoha et al. |
| 2003/0138061 | A1 | 7/2003 | Li |
| 2003/0171907 | A1 | 9/2003 | Gal-On et al. |
| 2005/0207605 | A1 | 9/2005 | Dehe et al. |
| 2006/0013415 | A1 | 1/2006 | Winchester |
| 2006/0074658 | A1 | 4/2006 | Chadha |
| 2006/0164151 | A1 | 7/2006 | Chatterjee et al. |
| 2007/0127761 | A1 | 6/2007 | Poulsen |
| 2007/0274297 | A1 | 11/2007 | Cross et al. |
| 2007/0278501 | A1 | 12/2007 | MacPherson et al. |
| 2008/0175425 | A1 | 7/2008 | Roberts et al. |
| 2008/0267431 | A1 | 10/2008 | Leidl et al. |
| 2008/0279407 | A1 | 11/2008 | Pahl |
| 2008/0283942 | A1 | 11/2008 | Huang et al. |
| 2009/0001553 | A1 | 1/2009 | Pahl et al. |
| 2009/0003629 | A1 | 1/2009 | Shajaan et al. |
| 2009/0180655 | A1 | 7/2009 | Tien et al. |
| 2009/0234645 | A1 | 9/2009 | Bruhn |
| 2009/0257289 | A1 | 10/2009 | Byeon |
| 2009/0316935 | A1 | 12/2009 | Furst et al. |
| 2010/0046780 | A1 | 2/2010 | Song |
| 2010/0052082 | A1 | 3/2010 | Lee et al. |
| 2010/0128914 | A1 | 5/2010 | Khenkin |
| 2010/0183181 | A1 | 7/2010 | Wang |
| 2010/0246877 | A1 | 9/2010 | Wang et al. |
| 2010/0290644 | A1 | 11/2010 | Wu et al. |
| 2010/0322443 | A1 | 12/2010 | Wu et al. |
| 2010/0322451 | A1 | 12/2010 | Wu et al. |
| 2011/0013787 | A1 | 1/2011 | Chang |
| 2011/0075875 | A1 | 3/2011 | Wu et al. |
| 2011/0107010 | A1 | 5/2011 | Strauss et al. |
| 2011/0170714 | A1 | 7/2011 | Hanzlik et al. |
| 2011/0293115 | A1 | 12/2011 | Henriksen |
| 2012/0112804 | A1 | 5/2012 | Li et al. |
| 2012/0113899 | A1 | 5/2012 | Overmars |
| 2012/0177227 | A1 | 7/2012 | Adachi |
| 2012/0232896 | A1 | 9/2012 | Taleb et al. |
| 2012/0250910 | A1 | 10/2012 | Shajaan et al. |
| 2012/0310641 | A1 | 12/2012 | Niemisto et al. |
| 2013/0035777 | A1 | 2/2013 | Niemisto et al. |
| 2013/0058495 | A1 | 3/2013 | Furst et al. |
| 2013/0195291 | A1 | 8/2013 | Josefsson |
| 2013/0223635 | A1 | 8/2013 | Singer et al. |
| 2013/0322461 | A1 | 12/2013 | Poulsen |
| 2014/0163978 | A1 | 6/2014 | Basye et al. |
| 2014/0244269 | A1 | 8/2014 | Tokutake |
| 2014/0244273 | A1 | 8/2014 | Laroche et al. |
| 2014/0257821 | A1 | 9/2014 | Adams et al. |
| 2014/0270260 | A1 | 9/2014 | Goertz et al. |
| 2014/0274203 | A1 | 9/2014 | Ganong et al. |
| 2014/0278435 | A1 | 9/2014 | Ganong et al. |
| 2014/0281628 | A1 | 9/2014 | Nigam et al. |
| 2014/0343949 | A1 | 11/2014 | Huang et al. |
| 2015/0106085 | A1 | 4/2015 | Lindahl |
| 2015/0112690 | A1 | 4/2015 | Guha et al. |
| 2015/0134331 | A1 | 5/2015 | Millet et al. |

FOREIGN PATENT DOCUMENTS

| | | | |
|---|---|---|---|
| CN | 1868118 | A | 11/2006 |
| CN | 101288337 | A | 10/2008 |
| CN | 1022224675.5 | A | 10/2011 |
| CN | 102272826 | A | 12/2011 |
| CN | 102568480 | A | 7/2012 |
| CN | 102770909 | A | 11/2012 |
| CN | 102983868 | A | 3/2013 |
| CN | 103117065 | A | 5/2013 |
| WO | WO-90/13890 | A1 | 11/1990 |
| WO | WO-02/03747 | A2 | 1/2002 |
| WO | WO-02/061727 | | 8/2002 |
| WO | WO-2005/009072 | A2 | 1/2005 |
| WO | WO-2007/009465 | A2 | 1/2007 |
| WO | WO-2010/060892 | A1 | 6/2010 |

| Transition | Requirements | Transition | Requirements |
|---|---|---|---|
| A1 | Apply Vdd<br>No clock on clock input pin | A1' | Remove Vdd |
| A2 | Apply Vdd<br>Apply 512kHz clock to clock imput pin | A2' | Remove Vdd |
| B1 | Acoustic Event Trigger | B1' | No Acoustic Activity for OTP programmed amount of time |
| B2 | Acoustic Event Trigger | B2' | No Acoustic Activity for OTP programmed amount of time |
| C | NO PATH IN THIS DIRECTION, BUFFER IS NOT VALID<br>MUST Go through E1' or E2' | C' | Clock Detected on Clock Pin > 1MHz |
| D | Remove Vdd | D' | Apply Vdd<br>Clock Input > 1MHz |
| E1 | Clock Detected > 1MHz | E1' | No Clock on Clock pin |
| E2 | Clock Detected > 1MHz | E2' | Clock Detected at 512kHz |
| E3 | Clock Detected at 512kHz | E3' | No Clock on Clock pin |

*FIG. 5*

MICROPHONE AND CORRESPONDING DIGITAL INTERFACE

CROSS REFERENCE TO RELATED APPLICATION

This application is a continuation of U.S. patent application Ser. No. 14/533,652, filed Nov. 5, 2014, which is a continuation-in-part of U.S. patent application Ser. No. 14/282,101, filed May 20, 2014, now U.S. Pat. No. 9,745,923, which claims the benefit of and priority to U.S. Provisional Application No. 61/826,587, filed May 23, 2013, and U.S. Provisional Application No. 61/901,832, filed Nov. 8, 2013, the entire contents of each of which are incorporated by reference in their entireties.

TECHNICAL FIELD

This application relates to acoustic activity detection (AAD) approaches and voice activity detection (VAD) approaches, and their interfacing with other types of electronic devices.

BACKGROUND

Voice activity detection (VAD) approaches are important components of speech recognition software and hardware. For example, recognition software constantly scans the audio signal of a microphone searching for voice activity, usually, with a MIPS intensive algorithm. Since the algorithm is constantly running, the power used in this voice detection approach is significant.

Microphones are also disposed in mobile device products such as cellular phones. These customer devices have a standardized interface. If the microphone is not compatible with this interface it cannot be used with the mobile device product.

Many mobile devices have speech recognition included with the mobile device. However, the power usage of the algorithms are taxing enough to the battery that the feature is often enabled only after the user presses a button or wakes up the device. In order to enable this feature at all times, the power consumption of the overall solution must be small enough to have minimal impact on the total battery life of the device. As mentioned, this has not occurred with existing devices.

Because of the above-mentioned problems, some user dissatisfaction with previous approaches has occurred.

BRIEF DESCRIPTION OF THE DRAWINGS

For a more complete understanding of the disclosure, reference should be made to the following detailed description and accompanying drawings wherein:

FIG. 5 is a table showing the conditions for transitions between the states shown in the state diagram of FIG. 4.

Figure 1A:
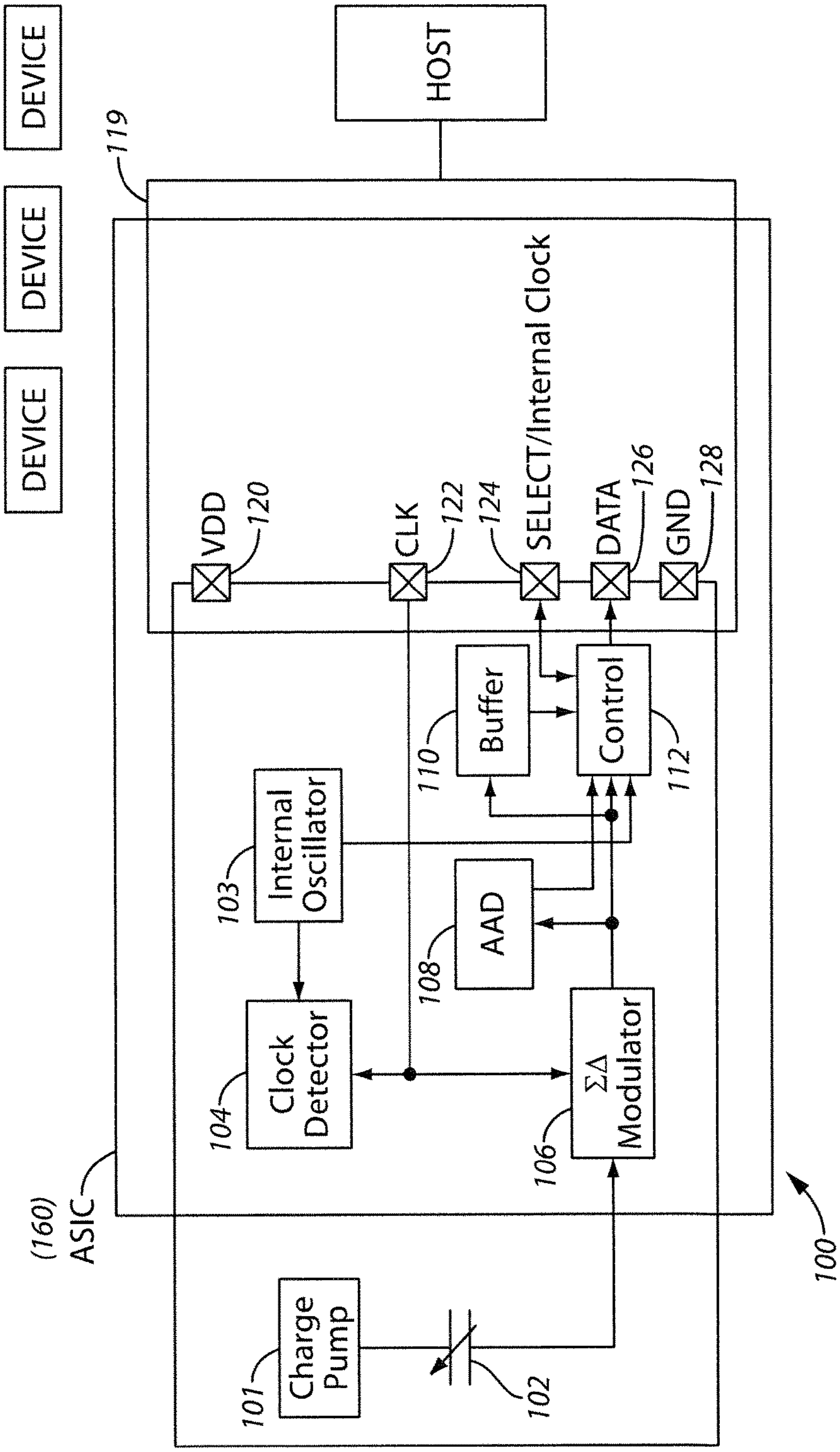
FIG. 1A is a block diagram of an acoustic system with acoustic activity detection (AAD)

Skilled artisans will appreciate that elements in the figures are illustrated for simplicity and clarity. It will be appreciated further that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that integrate voice activity detection (VAD) or acoustic activity detection (AAD) approaches into microphones. At least some of the microphone components (e.g., VAD or AAD modules) are disposed at or on an application specific circuit (ASIC) or other integrated device. The integration of components such as the VAD or AAD modules significantly reduces the power requirements of the system thereby increasing user satisfaction with the system. An interface is also provided between the microphone and circuitry in an electronic device (e.g., cellular phone or personal computer) in which the microphone is disposed. The interface is standardized so that its configuration allows placement of the microphone in most if not all electronic devices (e.g., cellular phones). The microphone operates in multiple modes of operation including a lower power mode that still detects acoustic events such as voice signals.

In many of these embodiments, at a microphone analog signals are received from a sound transducer. The analog signals are converted into digitized data. A determination is made as to whether voice activity exists within the digitized signal. Upon the detection of voice activity, an indication of voice activity is sent to a processing device. The indication is sent across a standard interface, and the standard interface is configured to be compatible to be coupled with a plurality of devices from potentially different manufacturers.

In other aspects, the microphone is operated in multiple operating modes, such that the microphone selectively operates in and moves between a first microphone sensing mode and a second microphone sensing mode based upon one or more of whether an external clock is being received from a processing device, or whether power is being supplied to the microphone. Within the first microphone sensing mode, the microphone utilizes an internal clock, receives first analog signals from a sound transducer, converts the first analog signals into first digitized data, determines whether voice activity exists within the first digitized signal, and upon the detection of voice activity, sends an indication of voice activity to the processing device an subsequently switches from using the internal clock to receiving an external clock. Within the second microphone sensing mode, the microphone receives second analog signals from a sound transducer, converts the second analog signals into second digitized data, determines whether voice activity exists within the second digitized signal, and upon the detection of voice activity, sends an indication of voice activity to the processing device, and uses the external clock supplied by the processing device.

In some examples, the indication comprises a signal indicating voice activity has been detected or a digitized signal. In other examples, the transducer comprises one of a microelectromechanical system (MEMS) device, a piezoelectric device, or a speaker.

In some aspects, the receiving, converting, determining, and sending are performed at an integrated circuit. In other aspects, the integrated circuit is disposed at one of a cellular phone, a smart phone, a personal computer, a wearable electronic device, or a tablet. In some examples, the receiving, converting, determining, and sending are performed when operating in a single mode of operation.

In some examples, the single mode is a power saving mode. In other examples, the digitized data comprises PDM data or PCM data. In some other examples, the indication comprises a clock signal. In yet other examples, the indication comprises one or more DC voltage levels.

In some examples, subsequent to sending the indication, a clock signal is received at the microphone. In some aspects, the clock signal is utilized to synchronize data movement between the microphone and an external processor. In other examples, a first frequency of the received clock is the same as a second frequency of an internal clock disposed at the microphone. In still other examples, a first frequency of the received clock is different than a second frequency of an internal clock disposed at the microphone.

In some examples, prior to receiving the clock signal, the microphone is in a first mode of operation, and receiving the clock signal is effective to cause the microphone to enter a second mode of operation. In other examples, the standard interface is compatible with any combination of the PDM protocol, the $I^2S$ protocol, or the $I^2C$ protocol.

In other embodiments, an apparatus includes an analog-to-digital conversion circuit, the analog-to-digital conversion circuit being configured to receive analog signals from a sound transducer and convert the analog signals into digitized data. The apparatus also includes a standard interface and a processing device. The processing device is coupled to the analog-to-digital conversion circuit and the standard interface. The processing device is configured to determine whether voice activity exists within the digitized signal and upon the detection of voice activity, to send an indication of voice activity to an external processing device. The indication is sent across the standard interface, and the standard interface is configured to be compatible to be coupled with a plurality of devices from potentially different manufacturers.

Referring now to FIG. 1A, a microphone apparatus 100 includes a charge pump 101, a capacitive microelectromechanical system (MEMS) sensor 102, a clock detector 104, a sigma-delta modulator 106, an acoustic activity detection (AAD) module 108, a buffer 110, and a control module 112. It will be appreciated that these elements may be implemented as various combinations of hardware and programmed software and at least some of these components can be disposed on an ASIC.

The charge pump 101 provides a voltage to charge up and bias a diaphragm of the capacitive MEMS sensor 102. For some applications (e.g., when using a piezoelectric device as a sensor), the charge pump may be replaced with a power supply that may be external to the microphone. A voice or other acoustic signal moves the diaphragm, the capacitance of the capacitive MEMS sensor 102 changes, and voltages are created that become an electrical signal. In one aspect, the charge pump 101 and the MEMS sensor 102 are not disposed on the ASIC (but in other aspects, they may be disposed on the ASIC). It will be appreciated that the MEMS sensor 102 may alternatively be a piezoelectric sensor, a speaker, or any other type of sensing device or arrangement.

The clock detector 104 controls which clock goes to the sigma-delta modulator 106 and synchronizes the digital section of the ASIC. If an external clock is present, the clock detector 104 uses that clock; if no external clock signal is present, then the clock detector 104 use an internal oscillator 103 for data timing/clocking purposes.

The sigma-delta modulator 106 converts the analog signal into a digital signal. The output of the sigma-delta modulator 106 is a one-bit serial stream, in one aspect. Alternatively, the sigma-delta modulator 106 may be any type of analog-to-digital converter.

The buffer 110 stores data and constitutes a running storage of past data. By the time acoustic activity is detected, this past additional data is stored in the buffer 110. In other words, the buffer 110 stores a history of past audio activity. When an audio event happens (e.g., a trigger word is detected), the control module 112 instructs the buffer 110 to spool out data from the buffer 110. In one example, the buffer 110 stores the previous approximately 180 ms of data generated prior to the activity detect. Once the activity has been detected, the microphone 100 transmits the buffered data to the host (e.g., electronic circuitry in a customer device such as a cellular phone).

The acoustic activity detection (AAD) module 108 detects acoustic activity. Various approaches can be used to detect such events as the occurrence of a trigger word, trigger phrase, specific noise or sound, and so forth. In one aspect, the module 108 monitors the incoming acoustic signals looking for a voice-like signature (or monitors for other appropriate characteristics or thresholds). Upon detection of acoustic activity that meets the trigger requirements, the microphone 100 transmits a pulse density modulation (PDM) stream to wake up the rest of the system chain to complete the full voice recognition process. Other types of data could also be used.

The control module 112 controls when the data is transmitted from the buffer. As discussed elsewhere herein, when activity has been detected by the AAD module 108, then the data is clocked out over an interface 119 that includes a VDD pin 120, a clock pin 122, a select pin 124, a data pin 126 and a ground pin 128. The pins 120-128 form the interface 119 that is recognizable and compatible in operation with various types of electronic circuits, for example, those types of circuits that are used in cellular phones. In one aspect, the microphone 100 uses the interface 119 to communicate with circuitry inside a cellular phone. Since the interface 119 is standardized as between cellular phones, the microphone 100 can be placed or disposed in any phone that utilizes the standard interface. The interface 119 seamlessly connects to compatible circuitry in the cellular phone. Other interfaces are possible with other pin outs. Different pins could also be used for interrupts.

In operation, the microphone 100 operates in a variety of different modes and several states that cover these modes. For instance, when a clock signal (with a frequency falling within a predetermined range) is supplied to the microphone 100, the microphone 100 is operated in a standard operating mode. If the frequency is not within that range, the microphone 100 is operated within a sensing mode. In the sensing mode, the internal oscillator 103 of the microphone 100 is being used and, upon detection of an acoustic event, data transmissions are aligned with the rising clock edge, where the clock is the internal clock.

Figure 1B:
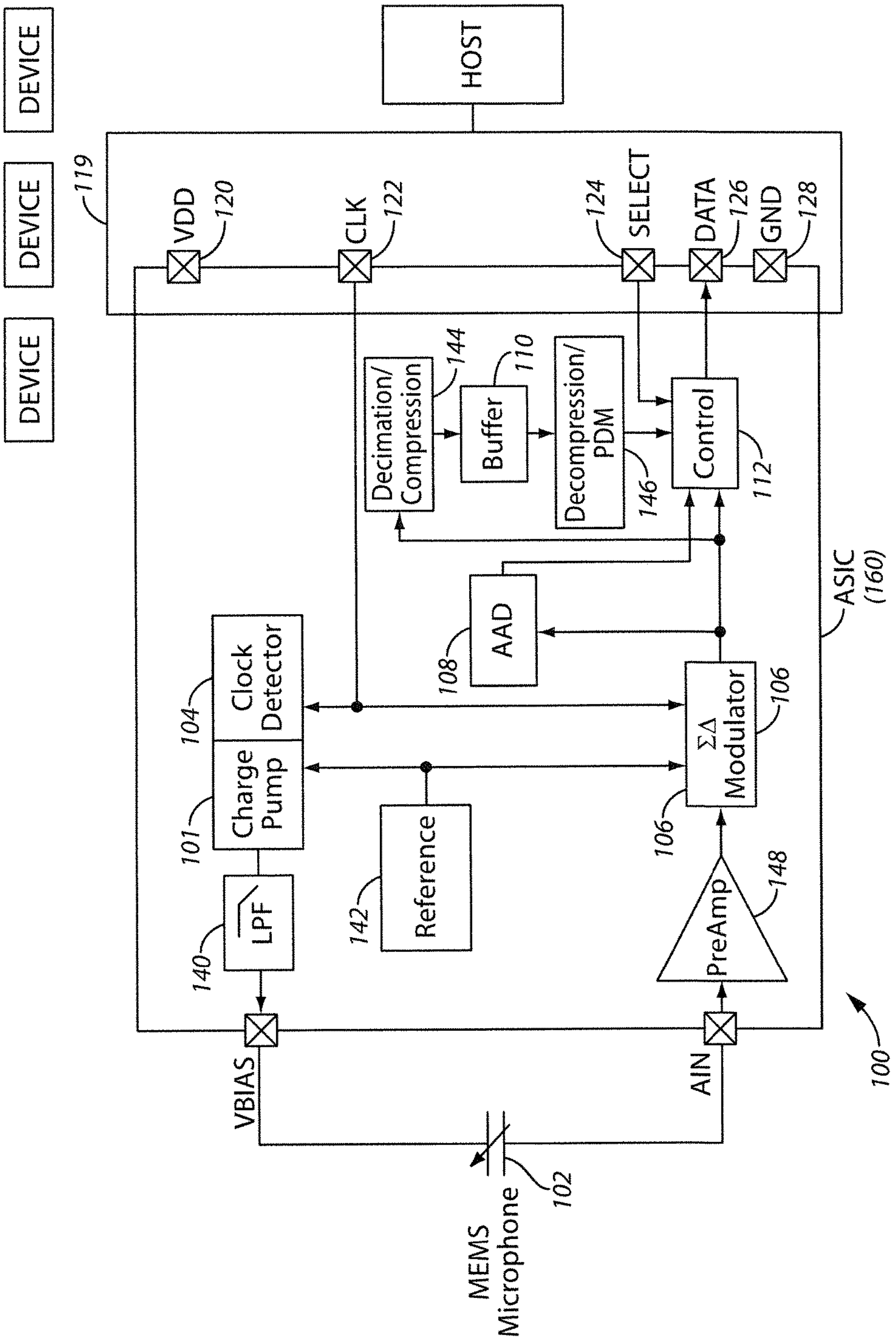
FIG. 1B is a block diagram of another acoustic system with acoustic activity detection (AAD)

Referring now to FIG. 1B, another example of a microphone 100 is described. This example includes the same elements as those shown in FIG. 1A and these elements are numbered using the same labels as those shown in FIG. 1A.

In addition, the microphone 100 of FIG. 1B includes a low pass filter 140, a reference 142, a decimation/compression module 144, a decompression PDM module 146, and a pre-amplifier 148.

The function of the low pass filter 140 removes higher frequency from the charge pump. The function of the reference 142 is a voltage or other reference used by components within the system as a convenient reference value. The function of the decimation/compression module 144 is to minimize the buffer size used to compress and then store the data. The function of the decompression PDM module 146 is to pull the data apart for the control module. The function of the pre-amplifier 148 is bringing the sensor output signal to a usable voltage level.

The components identified by the label 100 in FIG. 1A and FIG. 1B may be disposed on a single application specific integrated circuit (ASIC) or other integrated device. However, the charge pump 101 is not disposed on the ASIC 160 in FIGS. 1A and is on the ASIC in the system of FIG. 1B. These elements may or may not be disposed on the ASIC in a particular implementation. It will be appreciated that the ASIC may have other functions such as signal processing functions.

Referring now to FIG. 2, FIG. 3, FIG. 4, and FIG. 5, a microphone (e.g., the microphone 100 of FIG. 1) operates in a standard performance mode and a sensing mode, and these are determined by the clock frequency. In standard performance mode, the microphone acts as a standard microphone in which it clocks out data as received. The frequency range required to cause the microphone to operate in the standard mode may be defined or specified in the datasheet for the part-in-question or otherwise supplied by the manufacturer of the microphone.

In sensing mode, the output of the microphone is tri-stated and an internal clock is applied to the sensing circuit. Once the AAD module triggers (e.g., sends a trigger signal indicating an acoustic event has occurred), the microphone transmits buffered PDM data on the microphone data pin (e.g., data pin 126) synchronized with the internal clock (e.g., a 512 kHz clock). This internal clock will be supplied to the select pin (e.g., select pin 124) as an output during this mode. In this mode, the data will be valid on the rising edge of the internally generated clock (output on the select pin). This operation assures compatibility with existing $I^2S$ compatible hardware blocks. The select pin (e.g., select pin 124) and the data pin (e.g., data pin 126) will stop outputting the clock signal and data a set time after activity is no longer detected. The frequency for this mode is defined in the datasheet for the part in question. In other examples, the interface is compatible with the PDM protocol or the $I^2C$ protocol. Other examples are possible.

The operation of the microphone described above is shown in FIG. 2. The select pin (e.g., select pin 124) is the top line, the data pin (e.g., data pin 126) is the second line from the top, and the clock pin (e.g., clock pin 122) is the bottom line on the graph. It can be seen that once acoustic activity is detected, data is transmitted on the rising edge of the internal clock. As mentioned, this operation assures compatibility with existing $I^2S$ compatible hardware blocks.

For compatibility to the DMIC-compliant interfaces in sensing mode, the clock pin (e.g., clock pin 122) can be driven to clock out the microphone data. The clock must meet the sensing mode requirements for frequency (e.g., 512 kHz). When an external clock signal is detected on the clock pin (e.g., clock pin 122), the data driven on the data pin (e.g., data pin 126) is synchronized with the external clock within two cycles, in one example. Other examples are possible. In this mode, the external clock is removed when activity is no longer detected for the microphone to return to lowest power mode. Activity detection in this mode may use the select pin (e.g., select pin 124) to determine if activity is no longer sensed. Other pins may also be used.

Figure 3:
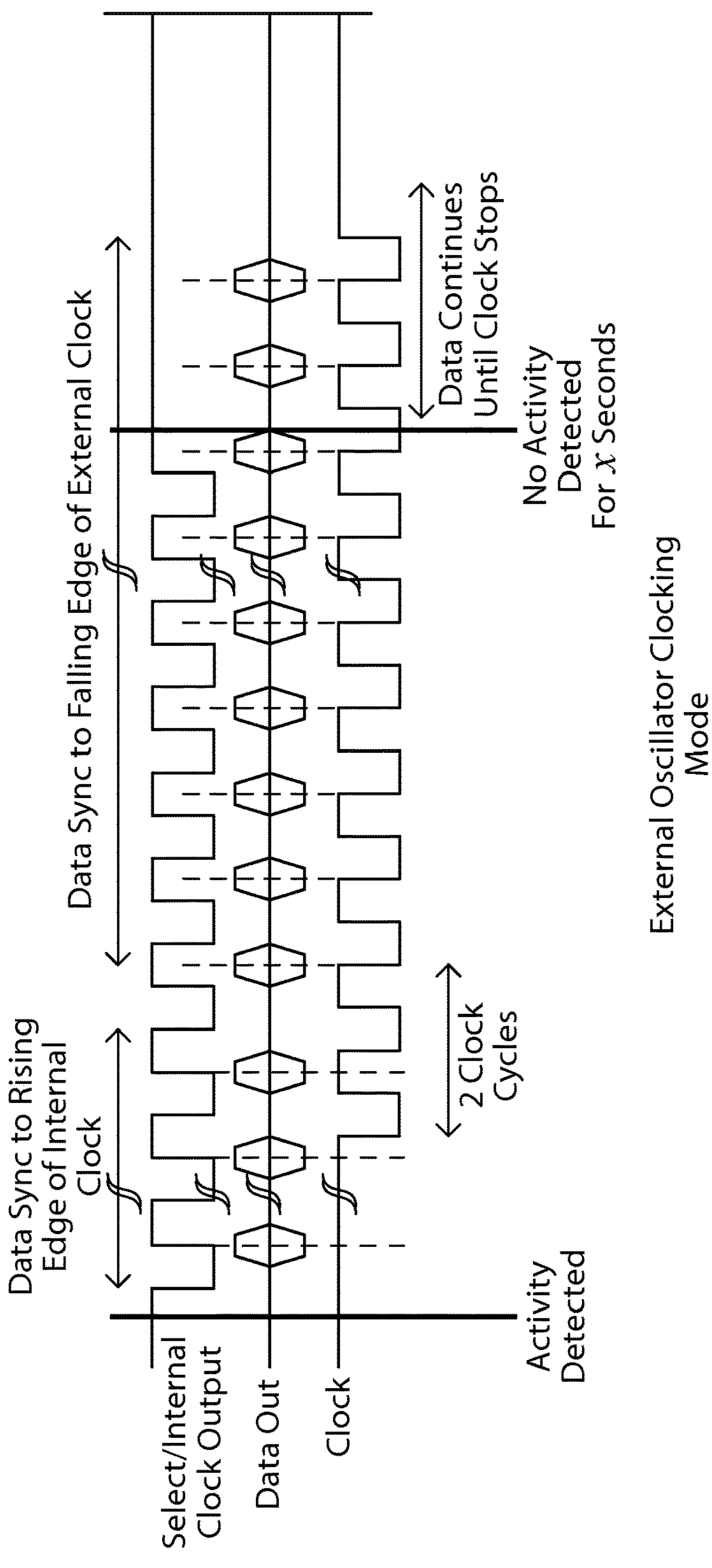
FIG. 3 is a timing diagram showing another aspect of the operation of the system of FIG. 1.

This operation is shown in FIG. 3. The select pin (e.g., select pin 124) is the top line, the data pin (e.g., data pin 126) is the second line from the top, and the clock pin (e.g., clock pin 122) is the bottom line on the graph. It can be seen that once acoustic activity is detected, the data driven on the data pin (e.g., data pin 126) is synchronized with the external clock within two cycles, in one example. Other examples are possible. Data is synchronized on the falling edge of the external clock. Data can be synchronized using other clock edges as well. Further, the external clock is removed when activity is no longer detected for the microphone to return to lowest power mode.

Figure 4:
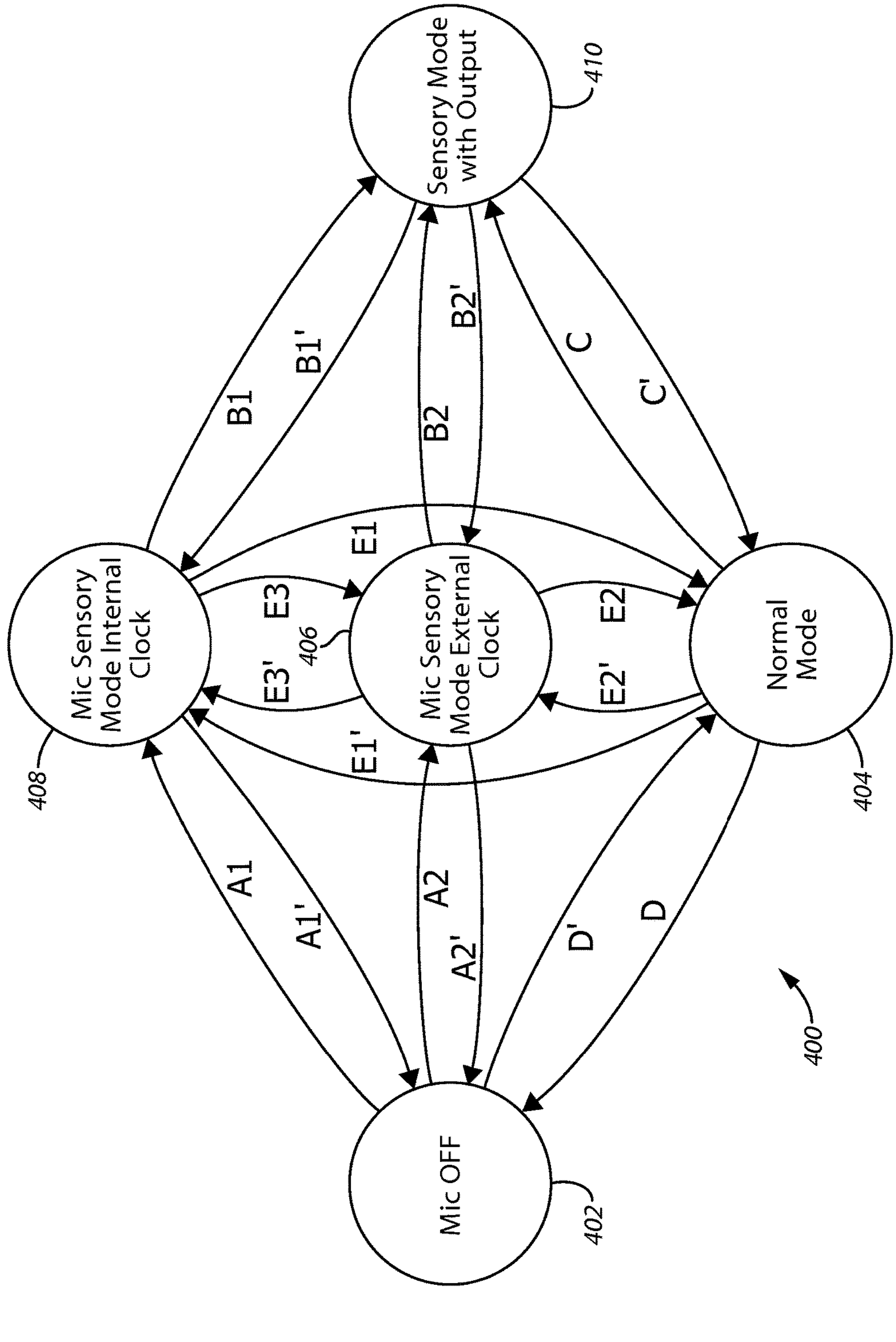
FIG. 4 is a state transition diagram showing states of operation of the system of FIG. 1.

Referring now to FIG. 4 and FIG. 5, a state transition diagram 400 (FIG. 4) and transition condition table 500 (FIG. 5) are described. The various transitions listed in FIG. 4 occur under the conditions listed in the table of FIG. 5. For instance, transition A1 occurs when Vdd is applied and no clock is present on the clock input pin. It will be understood that the table of FIG. 5 gives frequency values (which are approximate) and that other frequency values are possible. The term "OTP" means one time programming.

The state transition diagram of FIG. 4 includes a microphone off state 402, a normal mode state 404, a microphone sensing mode with external clock state 406, a microphone sensing mode internal clock state 408 and a sensing mode with output state 410.

Figure 2:
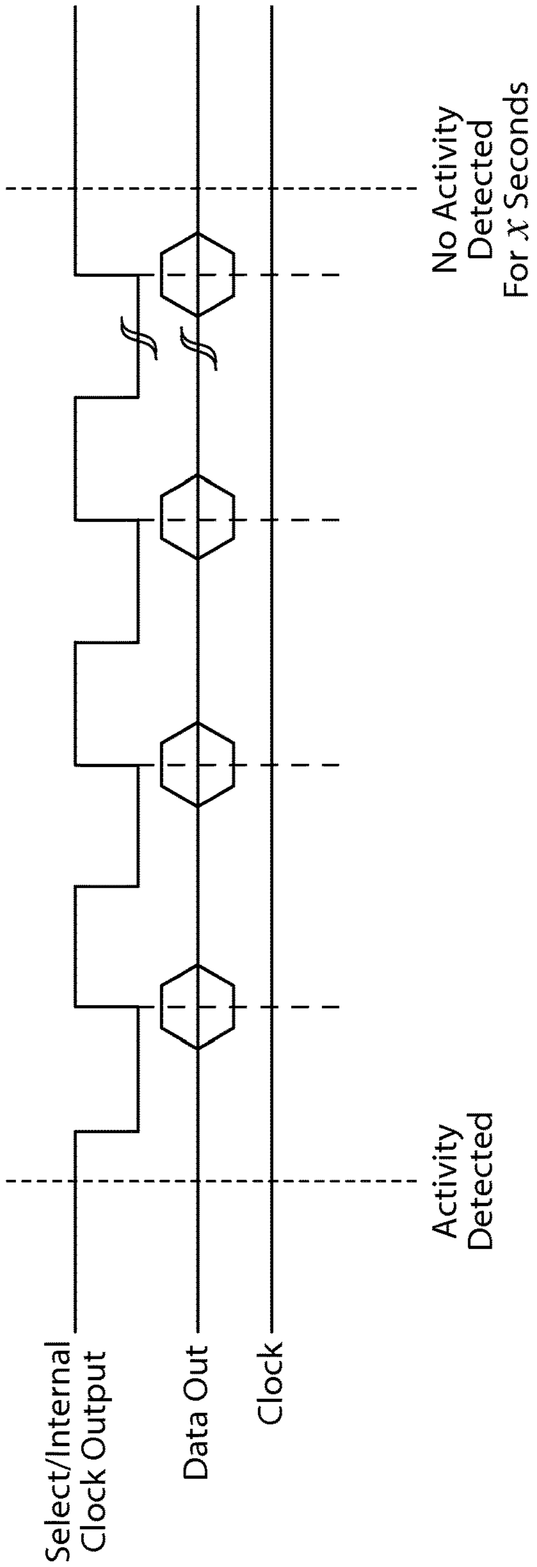
FIG. 2 is a timing diagram showing one aspect of the operation of the system of FIG. 1.

The microphone off state 402 is where the microphone 400 is deactivated. The normal mode state 404 is the state during the normal operating mode when the external clock is being applied (where the external clock is within a predetermined range). The microphone sensing mode with external clock state 406 is when the mode is switching to the external clock as shown in FIG. 3. The microphone sensing mode internal clock state 408 is when no external clock is being used as shown in FIG. 2. The sensing mode with output state 410 is when no external clock is being used and where data is being output also as shown in FIG. 2.

As mentioned, transitions between these states are based on and triggered by events. To take one example, if the microphone is operating in normal operating state 404 (e.g., at a clock rate higher than 512 kHz) and the control module detects the clock pin is approximately 512 kHz, then control goes to the microphone sensing mode with external clock state 406. In the external clock state 406, when the control module then detects no clock on the clock pin, control goes to the microphone sensing mode internal clock state 408. When in the microphone sensing mode internal clock state 408, and an acoustic event is detected, control goes to the sensing mode with output state 410. When in the sensing mode with output state 410, a clock of greater than approximately 1 MHz may cause control to return to state 404. The clock may be less than 1 MHz (e.g., the same frequency as the internal oscillator) and is used to synchronize data being output from the microphone to an external processor. No acoustic activity for an OTP programmed amount of time, on the other hand, causes control to return to state 406.

It will be appreciated that the other events specified in FIG. 5 will cause transitions between the states as shown in the state transition diagram of FIG. 4.

Preferred embodiments are described herein, including the best mode known to the inventors. It should be understood that the illustrated embodiments are exemplary only, and should not be taken as limiting the scope of the appended claims.

What is claimed is:

1. A method in a microphone apparatus, the method comprising:

producing an analog signal using a microelectromechanical system (MEMS) transducer;

converting the analog signal to digital data using an analog-to-digital converter;

determining whether acoustic activity exists within the digital data using an acoustic activity detector;

upon detecting acoustic activity, providing an indication of acoustic activity at an external-device interface of the microphone apparatus, the external-device interface standardized for compatibility with a plurality of devices from different manufacturers;

before detecting acoustic activity, operating the microphone apparatus in a first mode while determining whether acoustic activity exists within the digital data by clocking at least a portion of the microphone apparatus with an internal clock signal based on a local oscillator; and after detecting acoustic activity, operating the microphone apparatus in a second mode using an external clock signal received at the external-device interface.

2. The method of claim 1, wherein operating the microphone apparatus in the second mode includes providing output data at the external-device interface using the external clock signal.

3. The method of claim 2, further comprising receiving the external clock signal at the external-device interface in response to providing the indication of acoustic activity at the external-device interface, wherein the output data provided at the external-device interface in the second mode is synchronized with the external clock signal.

4. The method of claim 3, further comprising transitioning the microphone apparatus from operating in the second mode to operating in the first mode after acoustic activity is no longer detected, wherein the first mode has lower power consumption than the second mode.

5. The method of claim 4, further comprising buffering data representing the analog signal during acoustic activity detection, wherein at least some of the output data is based on buffered data.

6. The method of claim 4, wherein the indication of acoustic activity is provided at a select contact of the external-device interface, the external clock signal is received at a clock contact of the external-device interface, and the output data is provided at a data contact of the external-device interface.

7. The method of claim 1, wherein upon detecting acoustic activity comprises detecting voice activity.

8. The method of claim 1, wherein detecting acoustic activity comprises detecting a word or a phrase.

9. A microphone apparatus comprising:

a microelectromechanical system (MEMS) transducer configured to produce an analog signal in response to acoustic input;

an analog-to-digital converter coupled to the transducer and configured to convert the analog signal to digital data; and an acoustic activity detector configured to determine presence of acoustic activity by performing acoustic activity detection on the digital data;

before acoustic activity is detected, the microphone apparatus is configured to operate in a first mode by performing acoustic activity detection using an internal clock signal generated from a local oscillator of the microphone apparatus; and after acoustic activity is detected, the microphone apparatus is configured to operate in a second mode using an external clock signal received at an external-device interface of the microphone apparatus;

wherein the external-device interface is standardized for compatibility with devices from different manufacturers.

10. The apparatus of claim 9, wherein the acoustic activity detector is a voice activity detector configured to determine presence of voice activity by performing voice activity detection on the digital data; and wherein the microphone apparatus is configured to operate in the first mode before voice activity is detected, and wherein the microphone apparatus is configured to operate in the second mode after voice activity is detected.

11. The apparatus of claim 10, wherein the voice activity includes a word or a phrase.

12. The apparatus of claim 11, wherein the microphone apparatus is configured to receive the external clock signal in response to providing a signal on the external-device interface after detecting the voice activity and to provide output data on the external-device interface using the external clock signal.

13. The apparatus of claim 12, wherein the microphone apparatus is configured to provide the output data on the external-device interface for a specified time after determining that the voice activity is no longer present before discontinuing providing the output data on the external-device interface while operating in the second mode.

14. The apparatus of claim 9, wherein the microphone apparatus is configured to transition from operating in the second mode to operating in the first mode when the external clock signal is no longer received on the external-device interface.

15. The apparatus of claim 12, wherein the microphone apparatus is configured to buffer data representing the analog signal during acoustic activity detection, and wherein the output data includes buffered data.

16. The apparatus of claim 12, wherein the external-device interface includes a clock contact, a data contact, and a select contact, and wherein the microphone apparatus is configured to:

provide the signal on the select contact after detecting voice activity;

receive the external clock signal on the clock contact; and provide the output data on the data contact.

17. The apparatus of claim 9, wherein the external-device interface is compatible with at least one of a PDM protocol, an $I_2$ S protocol, and an $I^2$ C protocol.

18. A microphone apparatus comprising:

a microelectromechanical system (MEMS) transducer configured to generate an analog signal in response to an acoustic input;

an analog-to-digital converter coupled to the MEMS transducer, the analog-to-digital converter configured to generate digital data representative of the analog signal;

an acoustic activity detector coupled to the analog-to-digital converter;

a controller coupled to the analog-to-digital converter;

a local oscillator configured to generate an internal clock signal; and an external-device interface standardized for compatibility with devices from different manufacturers, the external-device interface coupled to the controller;

the microphone apparatus having a first mode of operation during which the microphone apparatus is clocked by the internal clock signal while the acoustic activity detector processes the digital data for acoustic activity; and the microphone apparatus having a second mode of operation during which the microphone apparatus is clocked by an external clock signal received at the external-device interface after acoustic activity is detected by the acoustic activity detector.

19. The apparatus of claim 18, wherein the controller is configured to provide an indication of the acoustic activity on the external-device interface and the external clock signal is received at the external-device interface in response to providing the indication.

20. The apparatus of claim 19, wherein the microphone apparatus is configured to provide output data representing the analog signal at the external-device interface using the external clock signal during the second mode of operation.

21. The apparatus of claim 19, wherein the microphone apparatus is configured to transition from the second mode of operation to the first mode of operation in absence of the external clock signal on the external-device interface.

22. The apparatus of claim 20, further comprising a buffer coupled to the analog-to-digital converter, wherein data representing the analog signal is buffered in the buffer during acoustic activity detection, and the output data includes buffered data.

23. The apparatus of claim 22, wherein the external-device interface is compatible with at least one of a PDM protocol, an $I^2S$ protocol, and an $I^2C$ protocol.

24. The apparatus of claim 18, wherein the acoustic activity detector is a voice activity detector and the acoustic activity is voice activity.

25. The apparatus of claim 24, wherein the voice activity includes a word or a phrase.

* * * * *